(12) United States Patent
Germann et al.

(10) Patent No.: US 10,503,145 B2
(45) Date of Patent: Dec. 10, 2019

(54) SYSTEM AND METHOD FOR ASSET FLEET MONITORING AND PREDICTIVE DIAGNOSTICS USING ANALYTICS FOR LARGE AND VARIED DATA SOURCES

(71) Applicant: Honeywell International Inc., Morris Plains, NJ (US)

(72) Inventors: David J. Germann, North Vancouver (CA); Gregory E. Stewart, North Vancouver (CA); Marc Light, Saint Paul, MN (US); Dinkar Mylaraswamy, Fridley, MN (US)

(73) Assignee: Honeywell International Inc., Morris Plains, NJ (US)

( * ) Notice: Subject to any disclaimer, the term of this patent is extended or adjusted under 35 U.S.C. 154(b) by 538 days.

(21) Appl. No.: 14/871,205

(22) Filed: Sep. 30, 2015

(65) Prior Publication Data
US 2016/0282847 A1    Sep. 29, 2016

Related U.S. Application Data

(60) Provisional application No. 62/138,210, filed on Mar. 25, 2015.

(51) Int. Cl.
*G05B 19/4065* (2006.01)
*B23K 11/00* (2006.01)
*G05B 23/02* (2006.01)

(52) U.S. Cl.
CPC .......... *G05B 19/4065* (2013.01); *B23K 11/00* (2013.01); *G05B 23/0243* (2013.01); *G05B 2219/34427* (2013.01)

(58) Field of Classification Search
CPC ............... B23K 11/00; G05B 19/4065; G05B 19/34427; G05B 23/0243
See application file for complete search history.

(56) References Cited

U.S. PATENT DOCUMENTS 5,657,390 A     8/1997  Elgamal et al.
6,298,377 B1 * 10/2001  Hartikainen ....... G05B 19/4185
                                                  709/223

(Continued)

FOREIGN PATENT DOCUMENTS

EP       2555154 A1    2/2013
EP       2905665 A2    8/2015

(Continued)

OTHER PUBLICATIONS

Notification of Transmittal of the International Search Report and the Written Opinion of the International Searching Authority, or the Declaration dated Jun. 17, 2016 in connection with International Patent Application No. PCT/US2016/021553.

(Continued)

*Primary Examiner* — Kenneth M Lo
*Assistant Examiner* — Mohammad A Rahman

(57) ABSTRACT

A method includes receiving information associated with operation of multiple pieces of industrial equipment at multiple sites. The multiple pieces of industrial equipment are of a same or similar type, and the information represents different types of data including operational data associated with the multiple pieces of industrial equipment and text-based data associated with the multiple pieces of industrial equipment. The method also includes analyzing the information to identify correlations in the information associated with one or more conditions involving the pieces of industrial equipment. The method further includes, based on the analyzing, generating one or more monitoring rules or routines to be used to identify the one or more conditions. The multiple pieces of industrial equipment could include machines with rotating components, machines with heat transfer equipment, or general process equipment.

17 Claims, 5 Drawing Sheets

(56) References Cited

U.S. PATENT DOCUMENTS

| | | |
|---|---|---|
| 6,480,896 B1 | 11/2002 | Brown et al. |
| 6,816,973 B1 | 11/2004 | Gleichauf et al. |
| 7,130,891 B2 | 10/2006 | Bernardin et al. |
| 7,233,830 B1 | 6/2007 | Callaghan et al. |
| 7,266,417 B2 | 9/2007 | Liao |
| 7,286,897 B2 | 10/2007 | Liu et al. |
| 7,313,447 B2 | 12/2007 | Hsiung et al. |
| 7,343,152 B1 | 3/2008 | Khorram |
| 7,461,403 B1 | 12/2008 | Libenzi et al. |
| 7,548,977 B2 | 6/2009 | Agapi et al. |
| 7,584,274 B2 | 9/2009 | Bond et al. |
| 7,620,986 B1 | 11/2009 | Jagannathan et al. |
| 7,636,764 B1 | 12/2009 | Fein et al. |
| 7,684,876 B2 | 3/2010 | Grgic |
| 7,693,581 B2 | 4/2010 | Callaghan et al. |
| 7,799,273 B2 | 9/2010 | Popp |
| 7,870,106 B1 | 1/2011 | Nguyen et al. |
| 7,873,719 B2 | 1/2011 | Bishop et al. |
| 7,886,065 B1 | 2/2011 | Satish et al. |
| 7,957,335 B2 | 6/2011 | Durazzo et al. |
| 8,204,717 B2 | 6/2012 | McLaughlin et al. |
| 2002/0078382 A1 | 6/2002 | Sheikh et al. |
| 2003/0014498 A1 | 1/2003 | Kreidler et al. |
| 2003/0120778 A1 | 6/2003 | Chaboud et al. |
| 2003/0182359 A1 | 9/2003 | Vorchik et al. |
| 2003/0216888 A1 | 11/2003 | Ridolfo |
| 2004/0002943 A1 | 1/2004 | Merrill et al. |
| 2004/0128539 A1 | 7/2004 | Shureih |
| 2004/0206090 A1* | 10/2004 | Yee .................... F23C 13/00 60/777 |
| 2005/0021594 A1 | 1/2005 | Bernardin et al. |
| 2005/0195840 A1 | 9/2005 | Krapp et al. |
| 2005/0276228 A1 | 12/2005 | Yavatkar et al. |
| 2005/0278441 A1 | 12/2005 | Bond et al. |
| 2006/0004786 A1 | 1/2006 | Chen et al. |
| 2006/0059163 A1 | 3/2006 | Frattura et al. |
| 2006/0065393 A1 | 4/2006 | Modesitt |
| 2006/0155633 A1 | 7/2006 | Fellenstein et al. |
| 2006/0184626 A1 | 8/2006 | Agapi et al. |
| 2006/0230149 A1 | 10/2006 | Jackson |
| 2007/0055702 A1 | 3/2007 | Fridella et al. |
| 2008/0120414 A1 | 5/2008 | Kushalnagar et al. |
| 2008/0147264 A1 | 6/2008 | Doulatshahi et al. |
| 2008/0159289 A1 | 7/2008 | Narayanan et al. |
| 2008/0208361 A1 | 8/2008 | Grgic |
| 2008/0270523 A1 | 10/2008 | Parmar et al. |
| 2008/0295173 A1 | 11/2008 | Tsvetanov |
| 2009/0058088 A1 | 3/2009 | Pitchford et al. |
| 2009/0125370 A1 | 5/2009 | Blondeau et al. |
| 2009/0132070 A1 | 5/2009 | Ebrom et al. |
| 2009/0172035 A1 | 7/2009 | Lessing et al. |
| 2009/0210071 A1 | 8/2009 | Agrusa et al. |
| 2009/0271012 A1 | 10/2009 | Kopka et al. |
| 2009/0300151 A1 | 12/2009 | Friedman et al. |
| 2009/0300210 A1 | 12/2009 | Ferris |
| 2009/0300635 A1 | 12/2009 | Ferris |
| 2010/0022231 A1 | 1/2010 | Heins et al. |
| 2010/0023151 A1 | 1/2010 | Shieh et al. |
| 2010/0042720 A1 | 2/2010 | Stienhans et al. |
| 2010/0256794 A1 | 10/2010 | McLaughlin et al. |
| 2010/0257227 A1 | 10/2010 | McLaughlin et al. |
| 2010/0257228 A1 | 10/2010 | Staggs et al. |
| 2010/0257605 A1 | 10/2010 | McLaughlin et al. |
| 2011/0130914 A1 | 6/2011 | Shah et al. |
| 2012/0303150 A1* | 11/2012 | Krishnaswamy ...... G05B 17/02 700/110 |
| 2013/0268196 A1* | 10/2013 | Dam .................... G01W 1/00 702/3 |
| 2013/0297603 A1* | 11/2013 | Brenker ............. G06F 11/3006 707/737 |
| 2014/0139342 A1* | 5/2014 | Brown ................. G08B 21/12 340/603 |
| 2014/0200686 A1* | 7/2014 | Madam .............. G05B 23/0229 700/52 |
| 2014/0236650 A1 | 8/2014 | Davenport et al. |
| 2014/0297329 A1* | 10/2014 | Rock ................. G06F 19/3456 705/3 |

FOREIGN PATENT DOCUMENTS

| | | |
|---|---|---|
| JP | 2005330935 A | 12/2005 |
| WO | WO 2005/020179 A1 | 3/2005 |

OTHER PUBLICATIONS

Aaron Skonnard, "Why Service Virtualization Matters", Microsoft Services, 4 pages, Mar. 2009.

Kevin P. Staggs, et al., "Cloud Computing for an Industrial Automation and Manufacturing System", U.S. Appl. No. 12/416,859, filed Apr. 1, 2009.

Paul F. McLaughlin, et al., "Cloud Computing for a Manufacturing Execution System", U.S. Appl. No. 12/416,790, filed Apr. 1, 2009.

Paul F. McLaughlin, et al., "Cloud Computing as a Basis for a Process Historian", U.S. Appl. No. 12/416,830, filed Apr. 1, 2009.

"Real-Time Data Hosting . . . ", www.industrialevolution.com/ms_services_host.html, 1 page, Jan. 2000.

Notification of Transmittal of the International Search Report and the Written Opinion of the International Searching Authority, or the Declaration dated Oct. 29, 2010 in connection with International Patent Application No. PCT/US2010/028218.

Notification of Transmittal of the International Search Report and the Written Opinion of the International Searching Authority, or the Declaration dated Oct. 29, 2010 in connection with International Patent Application No. PCT/US2010/028210.

Notification of Transmittal of the International Search Report and the Written Opinion of the International Searching Authority, or the Declaration dated Oct. 29, 2010 in connection with International Patent Application No. PCT/US2010/028208.

* cited by examiner

SYSTEM AND METHOD FOR ASSET FLEET MONITORING AND PREDICTIVE DIAGNOSTICS USING ANALYTICS FOR LARGE AND VARIED DATA SOURCES

CROSS-REFERENCE TO RELATED APPLICATION AND PRIORITY CLAIM

This application claims priority under 35 U.S.C. § 119(e) to U.S. Provisional Patent Application No. 62/138,210 filed on Mar. 25, 2015, which is hereby incorporated by reference in its entirety.

TECHNICAL FIELD

This disclosure relates generally to equipment monitoring and predictive diagnostics. More specifically, this disclosure relates to a system and method for asset fleet monitoring and predictive diagnostics using analytics for large and varied data sources.

BACKGROUND

Various industries include a large amount of industrial equipment at multiple locations. For example, power generation, oil and gas, and other industries may use large compressors, heat transfer equipment, or other equipment at multiple sites to perform various operations. Equipment used at multiple sites may be referred to as "fleet-wide assets." Scheduled and unscheduled maintenance of fleet-wide assets can result in significant production deferment and impact profitability and cost.

SUMMARY

This disclosure provides a system and method for asset fleet monitoring and predictive diagnostics using analytics for large and varied data sources.

In a first embodiment, a method includes receiving information associated with operation of multiple pieces of industrial equipment at one or more sites. The multiple pieces of industrial equipment are of a same or similar type, and the information represents different types of data including operational data associated with the multiple pieces of industrial equipment and text-based data associated with the multiple pieces of industrial equipment. The method also includes analyzing the information to identify correlations in the information associated with one or more conditions involving the pieces of industrial equipment. The method further includes, based on the analyzing, generating one or more monitoring rules or routines to be used to identify the one or more conditions.

In a second embodiment, a system includes at least one interface configured to receive information associated with operation of multiple pieces of industrial equipment at one or more sites. The multiple pieces of industrial equipment are of a same or similar type, and the information represents different types of data including operational data associated with the multiple pieces of industrial equipment and text-based data associated with the multiple pieces of industrial equipment. The system also includes at least one processing device configured to analyze the information to identify correlations in the information associated with one or more conditions involving the pieces of industrial equipment and generate one or more monitoring rules or routines to be used to identify the one or more conditions based on the analysis.

In a third embodiment, a non-transitory computer readable medium contains computer readable program code that when executed causes at least one processing device to obtain information associated with operation of multiple pieces of industrial equipment at one or more sites. The multiple pieces of industrial equipment are of a same or similar type, and the information represents different types of data including operational data associated with the multiple pieces of industrial equipment and text-based data associated with the multiple pieces of industrial equipment. The non-transitory computer readable medium also contains computer readable program code that when executed causes the at least one processing device to analyze the information to identify correlations in the information associated with one or more conditions involving the pieces of industrial equipment. The non-transitory computer readable medium further contains computer readable program code that when executed causes the at least one processing device to, based on the analysis, generate one or more monitoring rules or routines to be used to identify the one or more conditions.

In a fourth embodiment, a method includes providing first information associated with operation of at least one piece of industrial equipment at a site. The first information includes different types of data, including operational data associated with the at least one piece of industrial equipment and text-based data associated with the at least one piece of industrial equipment. The method also includes receiving one or more monitoring rules or routines. The one or more monitoring rules or routines are based on second information associated with operation of multiple pieces of industrial equipment at multiple sites. The multiple pieces of industrial equipment are of a same or similar type. The method further includes identifying any conditions with the at least one piece of industrial equipment using the one or more monitoring rules or routines.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
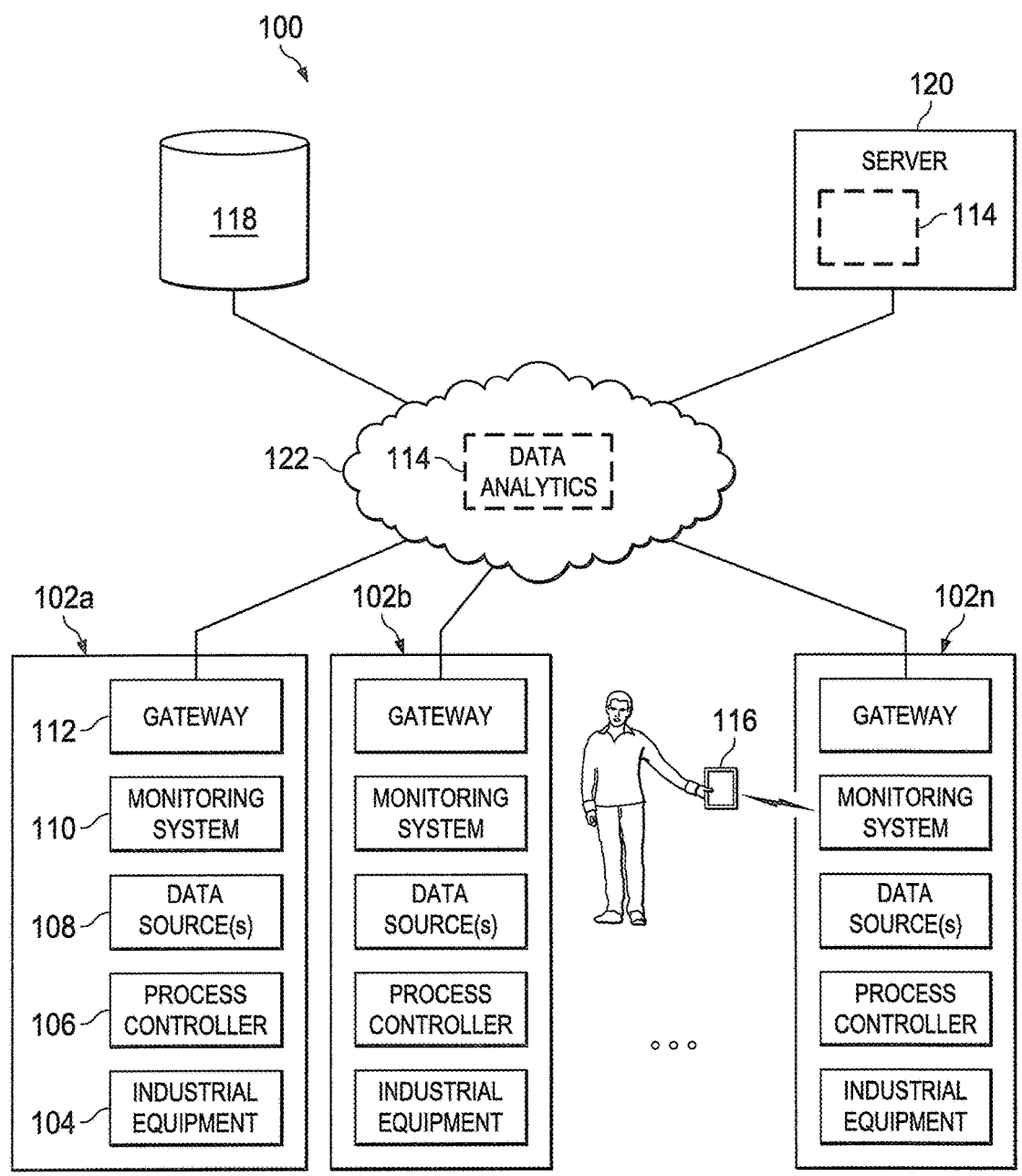
FIG. 1 illustrates an example system for asset fleet monitoring and predictive diagnostics using analytics for large and varied data sources according to this disclosure.

FIG. 1 illustrates an example system 100 for asset fleet monitoring and predictive diagnostics using analytics for large and varied data sources according to this disclosure. As shown in FIG. 1, the system 100 includes one or multiple sites 102a-102n. Each site 102a-102n generally denotes a location at which one or more pieces of monitored industrial equipment 104 are used. Different sites 102a-102n could denote different areas or zones within a single larger site or different areas or zones that are separated by small or large distances. Note that different areas or zones do not require physical separation but merely logical separation of equipment, so equipment that is side-by-side could be identified within different sites. Also, all sites 102a-102n could be associated with the same organization (such as a national or multi-national corporation), or different sites 102a-102n could be associated with different organizations (such as small or large national or multi-national corporations).

The industrial equipment 104 at each site 102a-102n represents industrial equipment whose operation can be monitored as described below using analytics for large and varied data sources. When the same type(s) of industrial equipment 104 are used at multiple sites, the industrial equipment 104 may be referred to as "fleet-wide assets." As examples, the industrial equipment 104 could include fleets of machines with rotating components, such as compressors, pumps, turbines, motors, or engines. The industrial equipment 104 could also include fleets of machines with heat transfer equipment, such as heat exchangers, heaters, or boilers. The industrial equipment 104 could further include fleets of general process equipment, such as reactors, vessels, and columns. In general, the industrial equipment 104 includes any suitable industrial equipment across multiple sites.

Each site 102a-102n may include one or more industrial process controllers 106, which are used to control the operations of the industrial equipment 104. Often times, process controllers 106 are arranged hierarchically at a site 102a-102n, with different levels performing different functions. For example, a lower-level controller 106 may use measurements from one or more sensors to control the operations of one or more actuators in order to monitor and adjust the overall operation of the industrial equipment 104. A higher-level controller 106 could perform planning, scheduling, or optimization functions to adjust the operation of the lower-level controller 106. Each controller 106 includes any suitable structure for controlling at least one aspect of an industrial site. A controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system, a WINDOWS operating system, or other operating system.

Each site 102a-102n may also include one or more data sources 108. Each data source 108 could represent a component that stores various information about or related to the site 102a-102n. For example, a data source 108 could store information collected or generated by the process controllers 106, sensors, actuators, or other components in a site. The amount of information stored by the data source 108 could vary in numerous ways, such as from site to site or from organization to organization. In some cases, a data source 108 could be used to store months or even years of data related to operation of an industrial site 102a-102n. Each data source 108 represents any suitable structure for storing and facilitating retrieval of information, such as process historians, maintenance logs, and other sources of process-related data.

Each site 102a-102n may further include one or more monitoring systems 110. A monitoring system 110 at a site 102a-102n could be used to monitor industrial equipment 104 online at that site and issue alerts, warnings, or other notifications automatically if any monitoring rules or monitoring routines are violated. As described below, the monitoring rules or monitoring routines could be determined by a remote source using data analytics, and the monitoring rules or monitoring routines could be provided to the monitoring systems 110 for use in identifying problems with the industrial equipment 104. Also, a monitoring system 110 could receive indicators obtained using data analytics related to problems with the industrial equipment 104. However determined, when problems with industrial equipment 104 are identified, the monitoring systems 110 could issue notifications automatically based on those determinations. Each monitoring system 110 includes any suitable structure supporting the online monitoring of industrial equipment.

In addition, each site 102a-102n may include one or more gateways 112. Each gateway 112 allows data transfers to or from a site 102a-102n. For example, a gateway 112 may allow the data source(s) 108 at a particular site 102a-102n to be accessed remotely so that data from the data source(s) 108 can be retrieved. As another example, a gateway 112 may allow the monitoring system 110 at a particular site 102a-102n to be accessed remotely so that monitoring rules or monitoring routines can be provided to the monitoring system 110 or so that any problems with industrial equipment 104 at that site could be identified to the monitoring system 110. Each gateway 112 could support any other or additional operations, depending on the implementation and the site 102a-102n at which the gateway 112 is used. Each gateway 112 includes any suitable structure supporting bi-directional communication with an industrial site.

While not shown, one or more networks can be used to support communications between various components within each site 102a-102n. For example, one or more proprietary or standard control networks could couple one or more process controllers 106 to industrial equipment 104. Also, one or more proprietary or standard data networks could couple one or more process controllers 106, data sources 108, monitoring systems 110, and gateways 112 together. In particular embodiments, each site 102a-102n could be arranged according to the "Purdue" model of process control.

As noted above, scheduled and unscheduled maintenance of fleet-wide assets can result in significant production deferment and impact profitability and cost. Operators of asset fleets can benefit significantly from advanced monitoring methodologies and predictive diagnostics, which allow them to minimize both scheduled and unscheduled downtime by accurately detecting or predicting equipment failures and operational inefficiencies. Predictive analytics can allow for improvements in equipment availability, maintenance planning, and parts replacement.

The system 100 of FIG. 1 supports this by executing data analytics 114 for large and varied data sources. The analytics 114 could be referred to as "big data" analytics in that the analyses performed involve data of large volumes with different formats or varieties that is continuously or otherwise generated at high rates or velocities. Often times, this data cannot be stored on one single standard storage device nor processed at once in memory by standard techniques and resources. Example types of data sources include sources of real-time or time-stamped instrument data or other process measurements, surveillance alert information, maintenance or other text logs, service data, downtime and deferment data, maintenance histories, work permits, or any other sources of equipment- or process-related data associated with industrial equipment. The data analytics 114 here can be performed over multiple assets, which can be side-by-side at the same site/network or spread over one site or multiple sites.

The data analytics 114 represent advanced predictive analytical software routines or other routines that analyze data associated with multiple sites 102*a*-102*n*. The data analytics 114 can be carried out fleet-wide over multiple data sources. The data analytics 114 operate to derive monitoring rules and monitoring routines, which represent the logic used during later analysis of process- or equipment-related data to predict potential problems with industrial equipment 104. In other words, the data analytics 114 analyze data and identify the logic that can be used by monitoring systems 110 or other components to analyze additional data and detect problems with the industrial equipment 104.

In some embodiments, the data analytics 114 could analyze data offline once with a given set of data. Once the monitoring rules and monitoring routines are derived, they are deployed to the various monitoring systems 110, which monitor the industrial equipment 104 online and issue alerts or other notifications if any of the rules and routines is violated. If a monitoring system 110 detects that a monitoring rule or routine is violated, the monitoring system 110 can send one or more notifications, such as to at least one device 116 used by personnel associated with the industrial equipment 104. Example types of notifications could include text messages and emails sent to portable devices 116, alarms or other graphical indicators displayed on screens of devices 116 in control rooms, or any other suitable notifications. The information generated by the data analytics 114 could be used in any other suitable manner. In particular embodiments, the data analytics 114 also perform frequent updates of the monitoring rules and monitoring routines as new data becomes available, or the monitoring rules and monitoring routines can be automatically updated with new data at certain intervals.

This proposed approach can be deployed for use with various asset fleets, such as rotating machinery (like compressors, pumps, turbines, motors, or engines), heat transfer equipment (like heat exchangers, heaters, or boilers), and general process equipment (like reactors, vessels, or columns). Example details of the logic that could be executed to provide the data analytics 114 are provided below. Note that the details provided below may relate to specific example implementations of this functionality and that other implementations could function differently.

To support the use of the data analytics 114, data associated with a large number of assets could be collected and stored in one or more databases 118. The collection of this data could occur in any suitable manner. For example, the various sites 102*a*-102*n* could be queried for this data, or the data could be collected and provided in a manual or automated manner from the sites 102*a*-102*n* at regular or other intervals. Each database 118 includes any suitable structure for storing and facilitating retrieval of information. Each database 118 could also support any suitable data structure and any suitable extraction mechanism (such as SQL or SAP).

As shown in FIG. 1, the data analytics 114 could be provided in various ways. For example, in some embodiments, the data analytics 114 could be executed by one or more servers 120 or other standalone computing devices. Each server 120 could include one or more processing devices, one or more memories, and one or more interfaces. Each processing device includes any suitable processing or computing device, such as a microprocessor, microcontroller, digital signal processor, field programmable gate array, application specific integrated circuit, or discrete logic devices. Each memory includes any suitable storage and retrieval device, such as a RAM or Flash or other ROM. Each interface includes any suitable structure facilitating communication over a connection or network, such as a wired interface (like an Ethernet interface) or a wireless interface (like a radio frequency transceiver).

In other embodiments, the data analytics 114 could be executed within a network-based environment 122, such as a computing cloud. The network-based environment 122 could include various components that support network-based analysis of industrial equipment. For example, the network-based environment 122 could include servers or other computing devices executing logic that analyzes data associated with the industrial equipment, as well as database servers or other computing devices for storing data used by the logic. As is typical with computing clouds, the specific device or devices executing the data analytics 114 can change over time, such as when different servers are selected at different times for executing the data analytics 114 based on load balancing or other factors.

Note that the data analytics 114 could be implemented in any other suitable manner. For example, the data analytics 114 could be implemented on at least one computing device within one or more of the sites 102*a*-102*n*. Such an approach may be feasible when all sites 102*a*-102*n* involved in the monitoring are associated with the same organization (such as a single company). Such an approach may not be preferred when different sites 102*a*-102*n* involved in the monitoring are associated with different organizations, since one organization may not wish to analyze its competitor's data or provide its own data to a competitor.

Although FIG. 1 illustrates one example of a system 100 for asset fleet monitoring and predictive diagnostics using analytics for large and varied data sources, various changes may be made to FIG. 1. For example, the system 100 could include any number of sites, pieces of equipment, controllers, data sources, monitoring systems, gateways, equipment analytics, servers, databases, and network-based environments. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, systems such as this are highly configurable and can be configured in any suitable manner according to particular needs. In addition, FIG. 1 illustrates an example environment in which the functions of the data analytics 114 can be used. This functionality can be used in any other suitable device or system.

Figure 2:
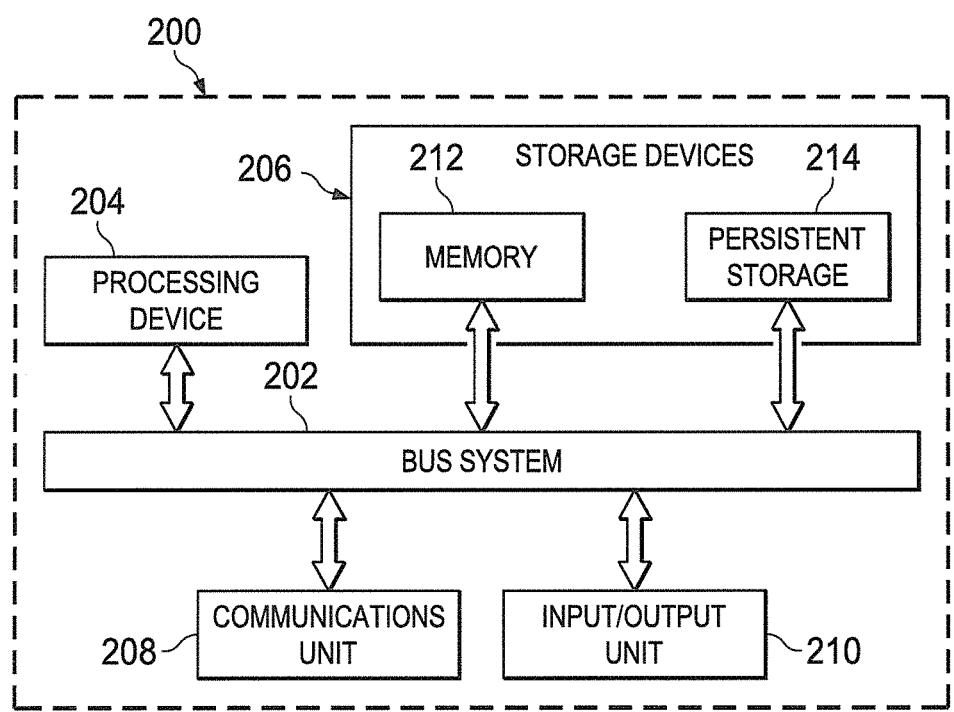
FIG. 2 illustrates an example device supporting asset fleet monitoring and predictive diagnostics using analytics for large and varied data sources according to this disclosure.

FIG. 2 illustrates an example device 200 supporting asset fleet monitoring and predictive diagnostics using analytics for large and varied data sources according to this disclosure. The device 200 could, for example, be used to execute part or all of the data analytics 114. As particular examples, the device 200 could represent the server 120 or one or more components within the network-based environment 122. The device 200 could, among other things, analyze data to generate monitoring rules and routines to be used for monitoring industrial equipment. The device 200 could also be used to execute the monitoring rules and routines identified by the data analytics 114. In those latter embodiments, the device 200 could represent part or all of a monitoring system 110 that receives the monitoring rules and routines from the data analytics 114, receives data about the industrial equipment 104, and analyzes the data about the industrial equipment 104 using the monitoring rules and routines. Note, however, that the data analytics 114 and the monitoring system 110 could be implemented using any other suitable device(s).

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a ready only memory, hard drive, Flash memory, or optical disc.

The communications unit 208 supports communications with other systems or devices. For example, the communications unit 208 could include a network interface card that facilitates communications over at least one Ethernet network. The communications unit 208 could also include a wireless transceiver facilitating communications over at least one wireless network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

Although FIG. 2 illustrates one example of a device 200 supporting asset fleet monitoring and predictive diagnostics using analytics for large and varied data sources, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

Figure 3:
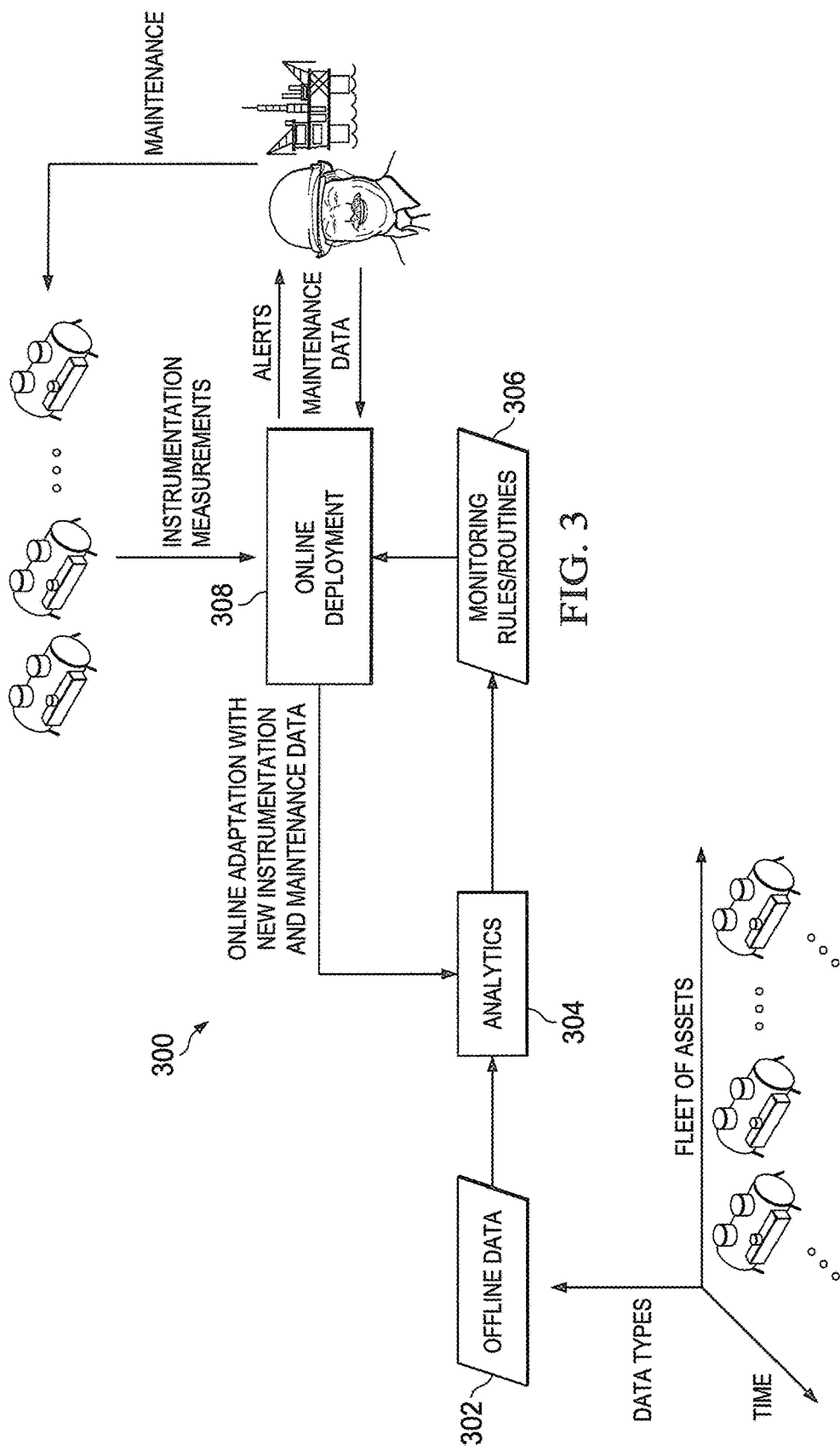
FIG. 3 illustrates an example process for asset fleet monitoring and predictive diagnostics using analytics for large and varied data sources according to this disclosure.

FIG. 3 illustrates an example process 300 for asset fleet monitoring and predictive diagnostics using analytics for large and varied data sources according to this disclosure. For ease of explanation, the process 300 shown in FIG. 3 is described as being used in the system 100 of FIG. 1. However, the process 300 could be used with any other suitable system.

As shown in FIG. 3, the process 300 involves the collection of a large amount of offline data 302. As noted above, the offline data 302 can be obtained from the data sources 108 via the gateways 112 and stored in the database 118 or other data storage component(s). Of course, the offline data 302 could be obtained in any other or additional manner. The offline data 302 is shown in FIG. 3 as being related to three axes—fleet of assets, time, and data types. This indicates that the offline data 302 relates to multiple assets in a fleet, such as multiple instances of the same or similar type of asset at one or multiple sites 102a-102n. This also indicates that the offline data 302 includes data associated with an extended period of time, such as multiple months- or even years-worth of data. This further indicates that the offline data 302 is associated with a variety of data types. The data types could include operational data from process historians, textual data entered by personnel into maintenance logs or other text-based filed, and other types of equipment- or process-related data.

The offline data 302 is subjected to various analytics 304, which could represent the data analytics 114 described above. The analytics 304 generally involve analyzing the data 302 and attempting to identify one or more characteristics that are indicative of one or more problems with the industrial equipment 104. These characteristics are used to define monitoring rules/routines 306, which define the logic used to detect certain problems or other conditions associated with the industrial equipment 104.

Any suitable analysis could occur as part of the analytics 304 using the data 302. For example, the analytics 304 could include performing statistical regressions or other data analyses to correlate the three axes of data 302. The analyses can involve data from various data sources across an entire fleet of assets, and the data can include historical data for an extended period of time (such as over multiple years). In addition, the analytics 304 could incorporate physical first-principles and semi-empirical models (such as heat transfer models, mass and energy balances, and turbo map functions) as opposed to implementing pure statistical modeling.

As particular examples of the types of analyses that could occur here, the analytics 304 could include clustering, failure detection and prediction, and text mining operations. Clustering involves grouping data associated with multiple assets in an attempt to identify "good" or normal behavioral characteristics of the assets and "bad" or abnormal behavioral characteristics of the assets. Failure detection and prediction involves using the normal and abnormal behavioral characteristics of the assets in order to identify possible problems and their causes, probabilities that the problems exist, and remaining useful life of equipment in light of the problems. Text mining involves analyzing maintenance logs and other text-based files to understand root causes and corrective actions recorded for particular problems and to catalogue behavioral characteristics, some of which could be abnormal. Overall, the goal of this type of analysis can include deriving correlations between real-time or time-stamped monitoring data and true maintenance data, such as correlations between sensor measurements involving the industrial equipment 104 and actual maintenance issues identified in the data. As a particular example, this type of analysis can include deriving correlations and trends in failure mechanisms, failure frequencies, and failure concentrations involving the industrial equipment 104. These correlations and trends can be used to obtain a predictive model for maintenance issues, and the predictive model could be expressed as one or more monitoring rules/routines 306.

Online deployment 308 refers to placing the monitoring rules/routines 306 into actual use. For example, during online deployment 308, the monitoring rules/routines 306 could be provided to the monitoring systems 110 at the sites 102a-102n for use in analyzing additional data about the industrial equipment 104. The additional data here could denote additional data about the same industrial equipment 104 or additional industrial equipment 104 for which data has not been uploaded to the data analytics 114. The additional data used by the monitoring systems 110 could include additional real-time or time-stamped instrument data or other process measurements, maintenance data, or other data. Note, however, that the monitoring rules/routines 306 could be provided to any other suitable destination(s) or used by the server 120 or network-based environment 122 to provide monitoring services. If a problem with certain industrial equipment is identified using the monitoring rules/routines 306, alerts or other warnings could be generated and provided to appropriate personnel, allowing the personnel to perform maintenance or other operations involving the industrial equipment.

As shown in FIG. 3, feedback is provided from the online deployment 308 to the analytics 304, indicating that online adaptation of the analytics 304 can be supported. Online adaptation refers to the process of providing new instrument, maintenance, or other data to the analytics 304 after the monitoring rules/routines 306 are deployed. The analytics 304 can use the new data, along with the previous data or the results from the previous analyses, to generate new or updated monitoring rules/routines 306, which can then be subjected to online deployment 308. This can help to increase the accuracy of the monitoring rules/routines 306 as more data is made available.

In this way, the analytics 114/304 can support all or any combination of the following features:

The ability to uncover correlations and trends in failure mechanisms based on (a) evaluating fleet-wide observations of multiple pieces of equipment instead of a single piece of equipment, (b) combining various data sources, such as real-time or time-stamped instrumentation data and maintenance logs, and (c) using historical data from prolonged periods of time, up to and including multiple years-worth of data. Current approaches focus more on individual equipment and do not correlate different data sources like instrumentation data with maintenance logs.

The ability to combine multi-customer data sources (data across multiple organizations), which allows analytics to be performed on rich sets of data with sufficient failure cases. This can be accomplished, for example, by hosting applications and analytics "in the cloud." Current approaches are more single-customer focused standalone applications.

The ability to update monitoring and diagnostic routines through online adaptation with new process and maintenance data as it becomes available. Current approaches are focused on one-time tuning, which can impact accuracy due to limited use of new information or variation in operation.

The ability to apply analytical methodologies, such as (a) clustering to determine good operation behavior versus abnormal behavior, (b) failure detection and prediction based on statistical learning methods and/or reference comparison with indication of possible cause, its probability, and remaining useful life of the equipment, and (c) text mining to understand root causes and corrective actions recorded in maintenance logs and other files and to catalogue behavioral characteristics, some of which could be abnormal.

The ability to augment purely statistical modeling approaches with physical first-principles and semi-empirical models to improve monitoring and prediction accuracy, reduce measurement requirements, and improve model extrapolation capabilities.

Although FIG. 3 illustrates one example of a process 300 for asset fleet monitoring and predictive diagnostics using analytics for large and varied data sources, various changes may be made to FIG. 3. For example, each of the operations shown in FIG. 3 could be repeated any number of times as needed or desired. Also, while shown as being performed serially, the operations shown in FIG. 3 could overlap or be performed in parallel.

Figure 4:
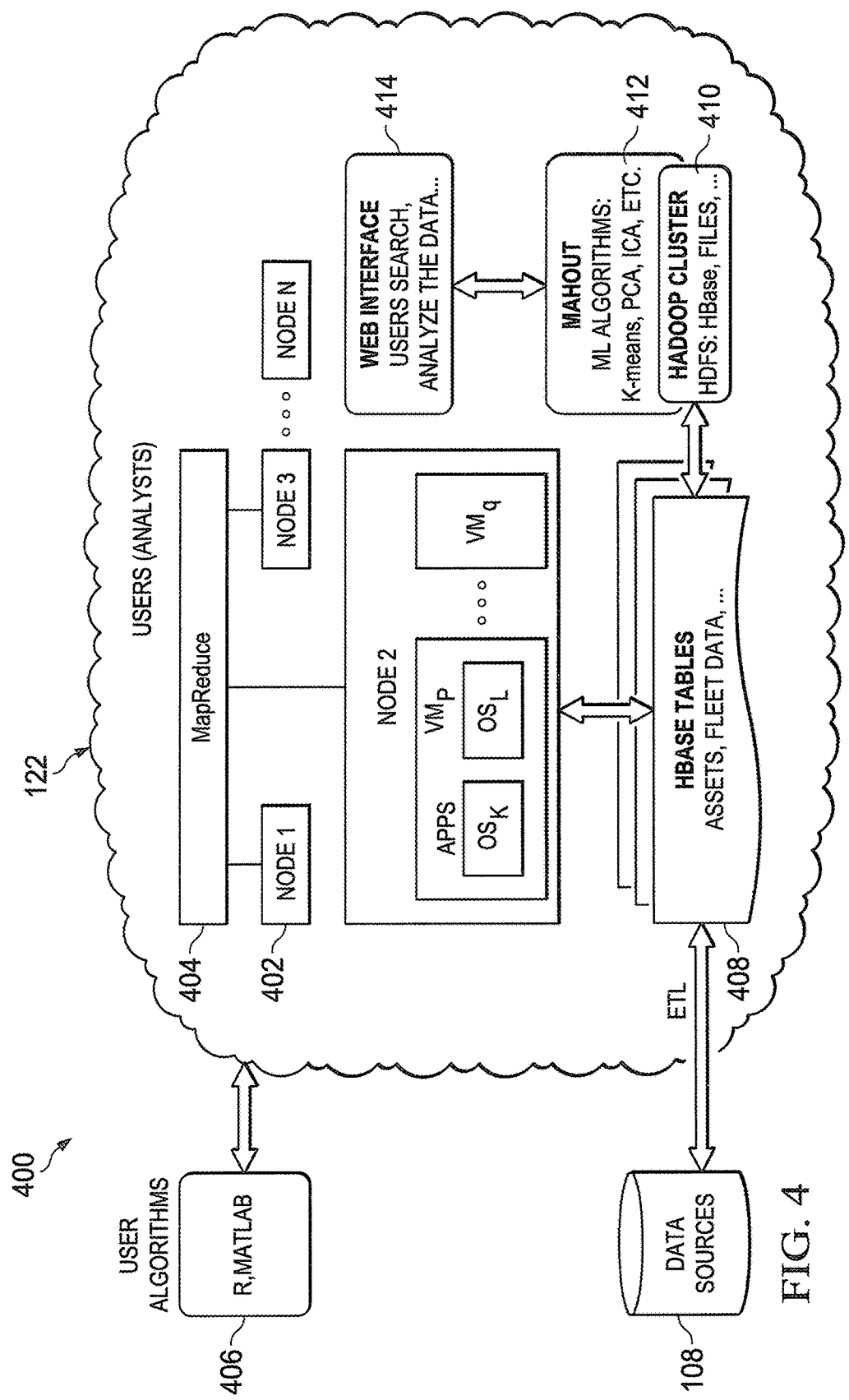
FIG. 4 illustrates details of a specific example implementation of a portion of a system for asset fleet monitoring and predictive diagnostics using analytics for large and varied data sources according to this disclosure.

FIG. 4 illustrates details of a specific example implementation of a portion of a system 400 for asset fleet monitoring and predictive diagnostics using analytics for large and varied data sources according to this disclosure. In particular, the system 400 shown here could represent a specific implementation of part of a cloud-based version of the system 100 shown in FIG. 1.

As shown in FIG. 4, the network-based environment 122 is implemented using various computing nodes 402. Each computing node 402 could support various applications executed within different virtual machines (VMs), and different virtual machines could support the use of different operating systems (OSs). Among other things, the computing nodes 402 can be used to process large amounts of data and identify correlations involving the data. The computing nodes 402 can therefore help to analyze the data for fleet-wide assets and identify correlations and trends in failure mechanisms, frequencies, and concentrations of industrial equipment. Processing by the computing nodes 402 can be coordinated by at least one managing node 404, which in this example implements the MapReduce programming model. Note, however, that other approaches for distributing or managing processor resources could be used. Algorithms executed by the computing nodes 402 to identify information related to industrial equipment could include predefined or standard algorithms and/or one or more user-defined algorithms 406.

Data from the various data sources 108 can be collected into various database tables 408, which could be stored in the database 118. In this example, the tables 408 represent APACHE HBASE tables, although any other suitable database technology could be used.

The data in the database tables 408 can be further organized in a HADOOP DISTRIBUTED FILE SYSTEM (HDFS) structure. The HDFS structure is supported using one or more HADOOP clusters 410, which denote clusters of servers or other computing instances. Note, however, that any other suitable file system structure could be used.

The data is subjected to one or more machine learning (ML) algorithms 412. The machine learning algorithms 412 support machine learning techniques to identify the correlations and trends in failure mechanisms, frequencies, and concentrations of the industrial equipment. As a particular example, the machine learning algorithms 412 can operate to perform feature extraction for instances where faults occurred with the industrial equipment. The feature extraction could occur using a soft margin estimation (SME) algorithm to identify time-series data (such as slope, jump, and slope change data). Domain-assisted text mining can also be used to facilitate keyword correlation. Other example machine learning techniques could include K-means clustering, principal component analysis (PCA), or independent component analysis (ICA). In this example, the machine learning algorithms 412 are performed using the APACHE MAHOUT system, although any other suitable machine learning technology could be used.

A web interface 414 supports user interaction with the network-based environment 122. For example, the web interface 414 could allow users to search through data collected by the system 400 and initiate or review results of analyses of the data. The web interface 414 could also allow users to trigger the uploading of data to the system 400, such as from one or more data sources 108. The web interface 414 could further allow users to download monitoring rules/routines 306 or other data from the system 400 to the users' monitoring systems 110 for use. The web interface 414 could support any suitable web-based interface, such as a secure browser interface. Moreover, the web interface 414 could allow functions of the system 400 to be made available to the users as web services or in any other suitable manner.

Although FIG. 4 illustrates details of one specific example implementation of a portion of a system 400 for asset fleet monitoring and predictive diagnostics using analytics for large and varied data sources, various changes may be made to FIG. 4. For example, while shown as supporting a cloud-based implementation for the analytics, the analytics could be implemented using one or more standalone computing devices. Also, the specific technologies shown in FIG. 4 are for illustration only.

Figure 5:
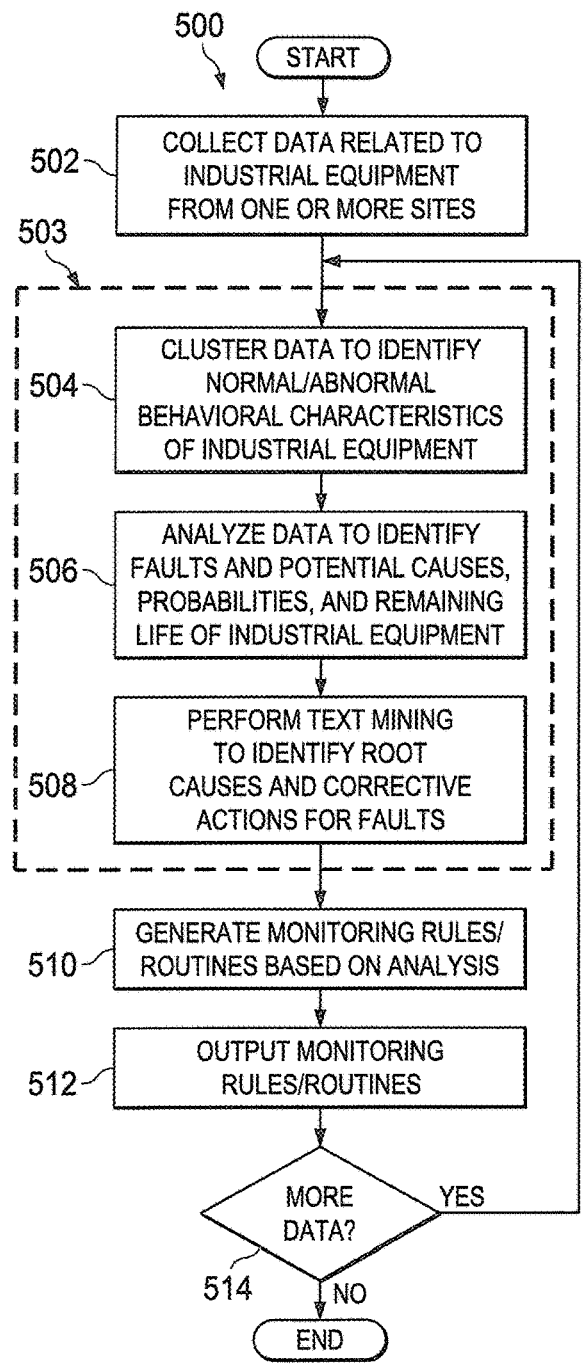
FIGS. 5 and 6 illustrate example methods supporting asset fleet monitoring and predictive diagnostics using analytics for large and varied data sources according to this disclosure.
Figure 6:
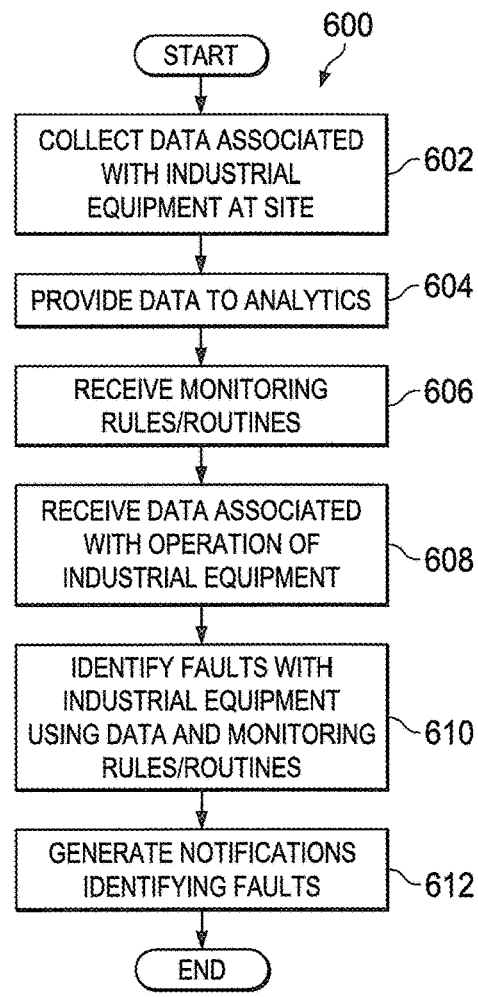

FIGS. 5 and 6 illustrate example methods 500 and 600 supporting asset fleet monitoring and predictive diagnostics using analytics for large and varied data sources according to this disclosure. In particular, FIG. 5 illustrates an example method 500 that could be performed by the server 120 or network-based environment 122, and FIG. 6 illustrates an example method 600 that could be performed by components at a site 102a-102n. However, each method could be used with any other suitable device and in any other suitable system.

As shown in FIG. 5, data related to industrial equipment from one or more sites is obtained at step 502. This could include, for example, the server 120 or network-based environment 122 obtaining data from the data sources 108 via the gateways 112. This could also include the server 120 or network-based environment 122 storing the data in various database tables in the database 118. The data could be collected in any suitable manner, such as via an automated or manual process. The data could also be associated with any number of asset types.

An analysis of the data occurs during a series of operations generally denoted as process 503. For example, the data can be clustered to identify normal or abnormal behavioral characteristics of the industrial equipment at step 504. This could include, for example, the server 120 or network-based environment 122 grouping data associated with the same or similar type of asset. This could also include the server 120 or network-based environment 122 analyzing the collected and grouped data to identify normal behavioral characteristics of each type of asset. This could further include the server 120 or network-based environment 122 analyzing the collected and grouped data to identify abnormal behavioral characteristics of each type of asset. Normal and abnormal behaviors of the asset types could be identified in any suitable manner, such as by analyzing the data associated with a single asset type to identify baseline (normal) behavior and then identifying instances when the data associated with the single asset type differs by a threshold amount from the baseline behavior. As another example, human operators could flag data associated with known faults that occurred with the industrial equipment 102.

The data can also be analyzed to identify faults and their potential causes, the probabilities of faults occurring, and the remaining lifetime of industrial equipment experiencing those faults at step 506. This could include, for example, the server 120 or network-based environment 122 using one or more machine learning techniques with the clustered data. The machine learning techniques can be used to identify the faults associated with the abnormal behavioral characteristics of each type of asset. The machine learning techniques can also be used to identify possible predictors of those faults, such as possible indicators in sensor measurements or other process- or equipment-related data. Different predictors can be associated with different fault probabilities, such as when one pattern in sensor measurements may potentially be indicative of a fault while another pattern is almost certainly indicative of a fault. In addition, the machine learning techniques can be used to estimate how much time a piece of industrial equipment can remain in operation in the presence of a fault. Again, different predictors can be associated with different remaining operational lifetimes, such as when one pattern in sensor measurements indicates a potential fault that could occur farther into the future while another pattern indicates a potential fault that could occur immediately.

The data can further be analyzed to support text mining in order to identify root causes and corrective actions for the faults and to catalogue behavioral characteristics, some of which could be abnormal, at step 508. This could include, for example, the server 120 or network-based environment 122 analyzing maintenance logs or other data files to identify what maintenance personnel ultimately concluded were the root causes of prior failures. The same data can also be used to identify how the personnel resolved the prior failures. Note that while steps 504-508 are shown here as serial operations, these operations can overlap and can use each other's results in various ways. For example, the root causes of prior failures could be used to help identify predictive indicators for future failures.

Various monitoring rules/routines are generated as a result of the analysis at step 510. This type of information can be expressed in a variety of ways. This could include, for example, the server 120 or network-based environment 122 generating a predictive model that associates particular characteristics or particular patterns of characteristics with faults in the industrial equipment. The monitoring rules/routines are output at step 512. This could include, for example, the server 120 or network-based environment 122 outputting the monitoring rules/routines to the database 118 for storage and later use. This could also include the server 120 or network-based environment 122 transmitting the monitoring rules/routines (in whatever form) to one or more monitoring systems 110 or other components for use in monitoring industrial equipment 104.

A determination is made whether additional data is available at step 514. If not, the method 500 can end. Otherwise, if additional data is available and online adaptation is desired, the method 500 can return to the analysis process 503 to update the analysis with the inclusion of the new data. The results of the update could represent new or updated monitoring rules/routines.

As shown in FIG. 6, data related to industrial equipment at a site is collected at step 602. This could include, for example, the data source(s) 108 at a site 102a-102n collecting and storing data from industrial equipment 104, process controllers 106, monitoring systems 110, or other data sources. The collected data is provided to analytics at step 604. This could include, for example, the data source(s) 108 at the site 102a-102n transmitting the collected data to the server 120 or network-based environment 122 via the gateway 112. The transmission of the collected data could occur in response to a user request, at a specific interval, in response to a triggering event, or at any other suitable time(s).

One or more monitoring rules/routines are received at step 606. This could include, for example, the monitoring system 110 receiving at least one predictive model or other data that associates particular characteristics or particular patterns of characteristics with faults in the industrial equipment. The monitoring rules/routines are based, at least in part, on the data provided to the analytics 114.

Data associated with operation of industrial equipment is received at step 608. This could include, for example, the monitoring system 110 receiving sensor measurements, actuator control signals, process controller data, or other data related to the industrial process or the industrial equipment 104. Faults with the industrial equipment are identified at step 610. This could include, for example, the monitoring system 110 using the monitoring rules/routines to process the data associated with the operation of the industrial equipment and identifying whether any of the data is indicative of a fault. If any faults are detected, one or more notifications identifying one or more faults are generated at step 612. This could include, for example, the monitoring system 110 generating one or more text messages or emails sent to one or more portable devices 116, one or more alarms or other graphical indicators displayed on one or more devices 116 in a control room, or any other suitable notifications.

Although FIGS. 5 and 6 illustrate examples of methods 500 and 600 supporting asset fleet monitoring and predictive diagnostics using analytics for large and varied data sources, various changes may be made to FIGS. 5 and 6. For example, while shown as a series of steps, various steps in each figure could overlap, occur in parallel, occur in a different order, or occur any number of times.

Note that the above description has described the identification of faults and the generation and use of monitoring rules or routines for identifying faults associated with industrial equipment. However, any other suitable conditions (such as user-defined conditions) associated with the industrial equipment could be identified and any suitable monitoring rules or routines for identifying those conditions could be generated and used.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for rule based monitoring of industrial equipment, the method comprising:
receiving information associated with the operation of multiple pieces of industrial equipment at one or more sites, the multiple pieces of industrial equipment being of a same or similar type, the information comprising different types of data including operational data associated with the multiple pieces of industrial equipment and text-based data associated with the multiple pieces of industrial equipment;
analyzing the information to identify normal behavior characteristics and abnormal behavior characteristics involving the pieces of industrial equipment, wherein the analysis of the information comprises:
clustering the information to identify normal or abnormal behavioral characteristics of the industrial equipment;
analyzing the information to identify faults and their potential causes, the probabilities of faults occurring, and the remaining lifetime of industrial equipment experiencing those faults;

performing text mining in order to identify root causes and corrective actions for the faults and to catalogue behavioral characteristics; and generating one or more monitoring rules or routines based on the normal behavior characteristics and abnormal behavior characteristics;

deploying the generated one or more monitoring rules or routines to a monitoring system;

detecting by the monitoring system one or more conditions involving the pieces of industrial equipment violating the generated one or more monitoring rules or routines; and transmitting a notification by the monitoring system, upon detecting a condition of the one or more conditions that indicates the abnormal behavior characteristics involving the pieces of industrial equipment, to a user device associated with the industrial equipment.

2. The method of claim 1, further comprising:

receiving additional information comprising at least one of: (i) more information associated with the operation of the pieces of industrial equipment and (ii) information associated with operation of additional pieces of industrial equipment; and generating one or more new or updated monitoring rules or routines using the additional information.

3. The method of claim 1, wherein analyzing the information comprises performing statistical modeling augmented with at least one of: one or more physical first principles models and one or more semi-empirical models.

4. The method of claim 1, wherein the multiple pieces of industrial equipment comprise at least one of: machines with rotating components, machines with heat transfer equipment, and general process equipment.

5. The method of claim 1, wherein:

the operational data comprises real-time or time-stamped instrumentation data associated with the multiple pieces of industrial equipment; and the text-based data comprises maintenance information associated with the multiple pieces of industrial equipment.

6. The method of claim 1, wherein the information associated with the operation of the pieces of industrial equipment comprises information associated with historical operations of the pieces of industrial equipment.

7. The method of claim 1, wherein the one or more conditions involving the pieces of industrial equipment comprise one or more faults with the pieces of industrial equipment.

8. An apparatus system comprising:

at least one interface configured to:

receive information associated with operation of multiple pieces of industrial equipment at one or more sites, the multiple pieces of industrial equipment being of a same or similar type, the information comprising different types of data including operational data associated with the multiple pieces of industrial equipment and text-based data associated with the multiple pieces of industrial equipment; and at least one processing device configured to:

analyze the information to identify normal behavioral characteristics and abnormal behavioral characteristics correlations in the information associated with one or more conditions involving the pieces of industrial equipment wherein the analysis of the information comprises:

clustering the information to identify the normal behavioral characteristics and the abnormal behavioral characteristics of the pieces of industrial equipment;

processing the clustered information using machine learning to identify at least one of possible causes of the abnormal behavioral characteristics of the pieces of industrial equipment, and probabilities of a probability that the abnormal behavioral characteristics exist, and determining a life span of the pieces of industrial equipment with the abnormal behavioral characteristics;

performing text mining to identify root causes and solutions for the abnormal behavioral characteristics and catalogue the abnormal behavioral characteristics of the pieces of industrial equipment; and based on the analysis, generate one or more monitoring rules or routines to be used to identify the one or more conditions based on the normal behavioral characteristics and abnormal behavioral characteristics;

deploy the generated one or more monitoring rules or routines to a monitoring system;

detect by the monitoring system one or more conditions involving the pieces of industrial equipment violating the generated one or more monitoring rules or routines; and transmit a notification by the monitoring system, upon detecting a condition of the one or more conditions that indicates the abnormal behavioral characteristics involving the pieces of industrial equipment, to a user device associated with the industrial equipment.

9. The apparatus of claim 8, wherein:

the at least one interface is further configured to receive additional information comprising at least one of: (i) more information associated with the operation of the pieces of industrial equipment and (ii) information associated with operation of additional pieces of industrial equipment; and the at least one processing device is further configured to generate one or more new or updated monitoring rules or routines using the additional information.

10. The apparatus of claim 8, wherein the at least one processing device is configured to analyze the information by performing statistical modeling augmented with at least one of: one or more physical first principles models and one or more semi-empirical models.

11. The apparatus of claim 8, wherein:

the operational data comprises real-time or time-stamped instrumentation data associated with the multiple pieces of industrial equipment; and the text-based data comprises maintenance information associated with the multiple pieces of industrial equipment.

12. The apparatus of claim 8, wherein the one or more conditions involving the pieces of industrial equipment comprise at least one of:

one or more user-defined conditions involving the pieces of industrial equipment; and one or more faults with the pieces of industrial equipment.

13. A non-transitory computer readable medium containing computer readable program code that when executed causes at least one processing device to:

obtain information associated with operation of multiple pieces of industrial equipment at one or more sites, the multiple pieces of industrial equipment being of a same or similar type, the information comprising different types of data including operational data associated with the multiple pieces of industrial equipment and text-based data associated with the multiple pieces of industrial equipment;

analyze the information to identify correlations in the information associated with one or more conditions of normal behavioral characteristics and abnormal behavioral characteristics involving the pieces of industrial equipment wherein the analysis of the information comprises:

clustering the information to identify the normal behavioral characteristics and the abnormal behavioral characteristics of the pieces of industrial equipment;

processing the clustered information using machine learning to identify at least one of possible causes of the abnormal behavioral characteristics of the pieces of industrial equipment, and probabilities of a probability that the abnormal behavioral characteristics exist, and determining a life span of the pieces of industrial equipment with the abnormal behavioral characteristics;

performing text mining to identify root causes and solutions for the abnormal behavioral characteristics and catalogue the abnormal behavioral characteristics of the pieces of industrial equipment; and based on the analysis, generate one or more monitoring rules or routines to be used to identify the one or more conditions based on the normal behavioral characteristics and abnormal behavioral characteristics;

deploy the generated one or more monitoring rules or routines to a monitoring system;

detecting by the monitoring system one or more conditions involving the pieces of industrial equipment violating the generated one or more monitoring rules or routines; and transmitting a notification upon detecting a condition of the one or more conditions that indicates the abnormal behavioral characteristics involving the pieces of industrial equipment, to a user device associated with the industrial equipment.

14. The non-transitory computer readable medium of claim 13, further comprises containing computer readable program code that when executed causes the at least one processing device to:

receive additional information comprising at least one of: (i) more information associated with the operation of the pieces of industrial equipment and (ii) information associated with operation of additional pieces of industrial equipment; and generate one or more new or updated monitoring rules or routines using the additional information.

15. The non-transitory computer readable medium of claim 13, wherein to analyze the information, the non-transitory computer readable medium further comprises computer readable program code that when executed causes the at least one processing device to analyze the information comprises:

computer readable program code that when executed causes the at least one processing device to perform statistical modeling augmented with at least one of: one or more physical first principles models and one or more semi-empirical models.

16. The non-transitory computer readable medium of claim 13, wherein:

the operational data comprises real-time or time-stamped instrumentation data associated with the multiple pieces of industrial equipment; and the text-based data comprises maintenance information associated with the multiple pieces of industrial equipment.

17. A method for rule based monitoring of industrial equipment, the method comprising:

providing first information associated with the operation of at least one piece of industrial equipment at a site, the first information comprising different types of data including operational data associated with the at least one piece of industrial equipment and text-based data associated with the at least one piece of industrial equipment;

analyze the information to identify correlations in the information associated with one or more conditions normal behavioral characteristics and abnormal behavioral characteristics involving the pieces of industrial equipment wherein analysis of the information comprises:

clustering the information to identify the normal behavioral characteristics and the abnormal behavioral characteristics of the pieces of industrial equipment;

processing the clustered information using machine learning to identify at least one of possible causes of the abnormal behavioral characteristics of the pieces of industrial equipment, and probabilities of a probability that the abnormal behavioral characteristics exist, or determining a life span of the pieces of industrial equipment with the abnormal behavioral characteristics;

performing text mining to identify root causes and solutions for the abnormal behavioral characteristics and catalogue the abnormal behavioral characteristics of the pieces of industrial equipment; and receiving one or more monitoring rules or routines, the one or more monitoring rules or routines based on second information associated with operation of multiple pieces of industrial equipment at multiple sites, the multiple pieces of industrial equipment being of a same or similar type;

deploying the generated one or more monitoring rules or routines to a monitoring system;

identifying detecting by the monitoring system any conditions with the at least one piece of industrial equipment violating the one or more monitoring rules or routines.

* * * * *